US012544967B2

(12) United States Patent
Hehmann et al.

(10) Patent No.: US 12,544,967 B2
(45) Date of Patent: Feb. 10, 2026

(54) BLOWN-FORM IDENTIFICATION IN A BLOWN FILM SYSTEM

(71) Applicant: Windmöller & Hölscher KG, Lengerich (DE)

(72) Inventors: Ingo Hehmann, Lengerich (DE); Marco Ventker-Stegemann, Lengerich (DE); Michel Bembenek, Lengerich (DE)

(73) Assignee: Windmöller & Hölscher KG, Lengerich (DE)

( * ) Notice: Subject to any disclaimer, the term of this patent is extended or adjusted under 35 U.S.C. 154(b) by 306 days.

(21) Appl. No.: 17/921,819

(22) PCT Filed: Apr. 28, 2021

(86) PCT No.: PCT/EP2021/061154
§ 371 (c)(1),
(2) Date: Oct. 27, 2022

(87) PCT Pub. No.: WO2021/219734
PCT Pub. Date: Nov. 4, 2021

(65) Prior Publication Data
US 2023/0211540 A1 Jul. 6, 2023

(30) Foreign Application Priority Data

Apr. 28, 2020 (DE) ...................... 10 2020 205 377.4

(51) Int. Cl.
*B29C 48/90* (2019.01)
*B29C 48/00* (2019.01)
(Continued)

(52) U.S. Cl.
CPC ........ *B29C 48/902* (2019.02); *B29C 48/0018* (2019.02); *B29C 48/32* (2019.02);
(Continued)

(58) Field of Classification Search
CPC ....... B29C 48/10; B29C 48/002; B29C 48/92; B29C 48/912; B29C 48/902; B29C 48/89;
(Continued)

(56) References Cited

U.S. PATENT DOCUMENTS

| 5,288,441 A | * | 2/1994 | Collins | ................... B29C 48/10 425/141 |
| 12,370,732 B2 | * | 7/2025 | Althermeler | .......... B29C 48/355 |
| 2005/0276876 A1 | * | 12/2005 | Koetke | ................... B29C 48/10 425/381 |
| 2007/0187856 A1 | * | 8/2007 | Kitauji | .................. B29C 48/495 264/510 |

(Continued)

FOREIGN PATENT DOCUMENTS

| GB | 2038038 A | 7/1980 | |
| WO | WO-2016198437 A1 | * 12/2016 | ............. B29C 48/06 |

*Primary Examiner* — Nahida Sultana
(74) *Attorney, Agent, or Firm* — Mandar A. Joshi; Bret E. Field; Bozicevic, Field & Francis LLP

(57) ABSTRACT

The invention relates to a blown film system for producing a film tube made of plastics material, comprising: an annular nozzle, out of which a plastic melt having a closed cross-section can be brought; a take-up device, by means of which the plastic melt can be drawn up from the direction of the annular nozzle so as to form the film tube; an air-provision device, which is downstream of the annular nozzle when viewed in the transport direction of the film tube and by means of which an amount of air can be provided; and a calibration device, which is downstream of the annular nozzle when viewed in the transport direction of the film tube and surrounds the film tube and by means of which the outer circumference of the film tube can be delimited. At least one detector is contained that has a plurality of detection elements, by means of which electromagnetic radiation emitted or reflected at various points of the film tube can be detected, such that at least one planar region and/or contoured region of the film tube can be detected with regard to (Continued)

Figure 1:
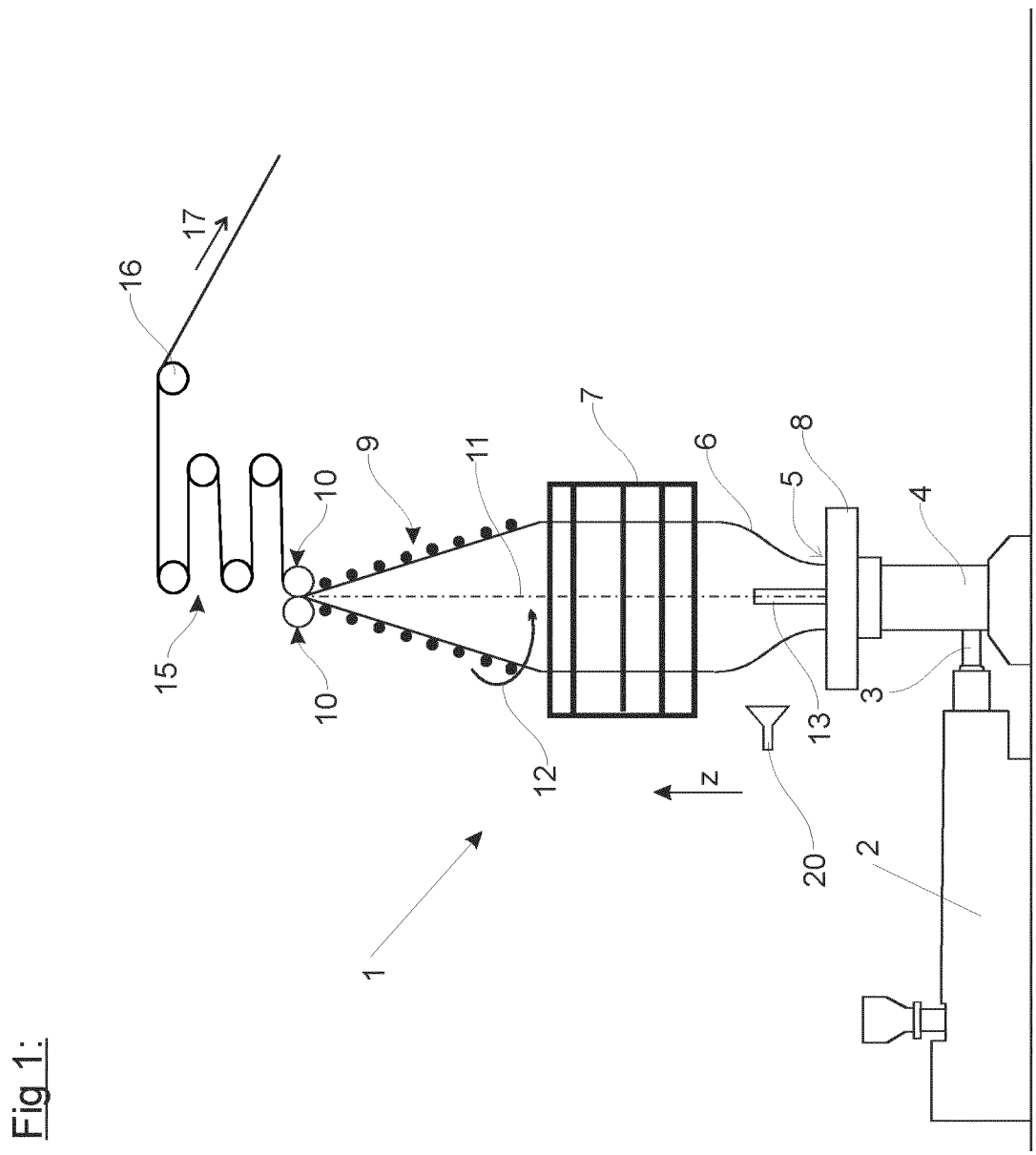

characteristic properties, wherein the detector comprises at least 32 detection elements.

4 Claims, 4 Drawing Sheets

(51) Int. Cl.
  *B29C 48/32* (2019.01)
  *B29C 48/88* (2019.01)
  *B29C 48/89* (2019.01)
  *B29C 48/91* (2019.01)
  *B29C 48/92* (2019.01)
  *B29C 55/28* (2006.01)

(52) U.S. Cl.
  CPC .......... *B29C 48/89* (2019.02); *B29C 48/9105* (2019.02); *B29C 48/912* (2019.02); *B29C 48/92* (2019.02); *B29C 55/28* (2013.01); *B29C 2948/92123* (2019.02); *B29C 2948/92428* (2019.02)

(58) Field of Classification Search
  CPC ................ B29C 48/32; B29C 48/0018; B29C 48/9105; B29C 55/28; B29C 2948/92123; B29C 2948/92428; B29C 2948/92171
  See application file for complete search history.

(56) References Cited

U.S. PATENT DOCUMENTS

| | | | |
|---|---|---|---|
| 2009/0136655 A1* | 5/2009 | Backmann | B29C 48/92 118/712 |
| 2011/0112677 A1* | 5/2011 | Franklin | B29C 48/92 700/103 |
| 2016/0052192 A1* | 2/2016 | Backmann | B29C 55/06 264/288.4 |
| 2020/0331185 A1* | 10/2020 | Lombardini | B29C 48/10 |
| 2021/0299931 A1* | 9/2021 | Shiota | B29C 48/0018 |

* cited by examiner

II - II

BLOWN-FORM IDENTIFICATION IN A BLOWN FILM SYSTEM

The invention relates to a blown film line and a method for producing a film tube from plastic.

A generic blown film line has been known for a long time. The heart of such a system is an annular nozzle from which a plastic melt can be discharged. Since the molten plastic is under pressure, this can also be referred to as a squeezing process. The plastic melt has a closed cross-section. This means that the plastic melt also has a ring-shaped design corresponding to the annular progress shape. The annular nozzle is preceded by one or (usually) several extruders, with which the plastic melt can be produced from plastic pellets. In the case of several extruders, the film tube is usually multilayered.

Arranged downstream of the annular nozzle is an extraction device with which the plastic melt can be extracted from the direction of the annular nozzle, forming the film tube. The extraction device often consists of two pairs of rollers forming a roller gap, at least one of which is driven. The circumferential speed of the rollers is usually greater than the discharge speed of the plastic melt from the annular nozzle. On its way between the annular nozzle and the extraction device, the film tube typically solidifies. It follows that the film tube is still formable in the area between the annular nozzle and the extraction device and is usually also shaped and otherwise modified so that the film obtains the desired properties.

For this purpose, a generic blown film line presents an air supply device behind the annular nozzle, as seen in the transport direction of the film tube, with which an air quantity can be supplied. This is preferably located inside the annular nozzle and extends at least partially in the direction of the extraction device and thus in the transport direction of the film tube. This is usually supplied with air through a film-blowing head surrounding the annular nozzle. The air supply device comprises openings so that the air can be demanded transversely to the transport direction of the film tube. The film tube can thus be cooled with this air. The air is usually subjected to pressure so that the film tube expands in the radial direction during transport.

Furthermore, a generic blown film line comprises, viewed in the transport direction of the film tube behind the annular nozzle, a calibrating device that surrounds the film tube and by means of which the outer circumference of the film tube can be limited. This calibration device is arranged upstream of the extraction device.

The supply of air, the circumferential speed of the rollers of the extraction device and the opening width, and the position in the direction of transport of the film tube of the calibration device influence the properties of the film tube. Before this is solidified, it can still be influenced to a considerable extent. The solidification process occurs along the so-called frost line.

However, there are considerable difficulties in accurately determining the properties of the film tube in the area between the annular nozzle and the frost line.

It is therefore the task of the present invention to improve a blown film line and a process for the production of a film tube made of plastic in such a way that at least parts of the properties of the film tube can also be determined at least partially in the region between the annular nozzle and the extraction device.

According to the invention, this task is solved by all features of claim 1. Possible embodiments of the invention are given in the dependent claims.

According to the present invention, at least one detector with several detection elements is provided with which transmitted, emitted, and/or reflected electromagnetic radiation is detectable from different points of the film tube. So that at least one area and/or a contour area of the film tube can be detected with respect to characteristic properties.

Accordingly, a detector is provided which comprises several detection elements, preferably arranged on a flat surface. These elements thus provide a lateral resolution of the viewed areas of the film tube. The detectors are suitable for detecting the intensity of electromagnetic radiation relative to the wavelength. However, often only a few or a discrete wavelength is detected. Preferably, detectors are envisaged which The detection elements thus provide a digitalized image of the observed area of the film tube. To improve this image, the detector can be preceded by an aperture and/or a lens or lens system. Electromagnetic radiation is meant, first of all, the radiation of any wavelength. In particular, a detector according to the invention comprises at least 32 detection elements, so that a sufficient number of points on the circumference of the film tube can be detected simultaneously. In particular, however, the detector features a so-called HD resolution i.e. at least 720 detection elements per lateral direction. Preferably a detector has a repetition rate of 9 Hz which means at least nine detections can be performed per second.

It is therefore the task of the present invention to improve a blown film line and a process for the production of a film tube made of plastic in such a way that at least parts of the properties of the film tube can also be determined at least partially in the region between the annular nozzle and the extraction device.

According to the invention, this task is solved by all features of claim 1. Possible embodiments of the invention are given in the dependent claims.

According to the present invention, at least one detector with several detection elements is provided with which transmitted, emitted, and/or reflected electromagnetic radiation is detectable from different points of the film tube. So that at least one area and/or a contour area of the film tube can be detected with respect to characteristic properties.

Accordingly, a detector is provided which comprises several detection elements, preferably arranged on a flat surface. These elements thus provide a lateral resolution of the viewed areas of the film tube. The detectors are suitable for detecting the intensity of electromagnetic radiation relative to the wavelength. However, often only a few or a discrete wavelength is detected. Preferably, detectors are envisaged which The detection elements thus provide a digitalized image of the observed area of the film tube. To improve this image, the detector can be preceded by an aperture and/or a lens or lens system. Electromagnetic radiation is meant, first of all, the radiation of any wavelength. In particular, a detector according to the invention comprises at least 32 detection elements, so that a sufficient number of points on the circumference of the film tube can be detected simultaneously. In particular, however, the detector features a so-called HD resolution i.e. at least 720 detection elements per lateral direction. Preferably a detector has a repetition rate of 9 Hz which means at least nine detections can be performed per second.

The electromagnetic radiation can be emitted by the film tube itself (in particular long-wave radiation due to the temperature of the film tube) or reflected by the film tube. In the latter case, the radiation consequently originates from at least one radiation source. In particular, at least one radiation source provided for the aforementioned purpose can be arranged, with which the film tube can be illuminated. Preferably, the wavelengths of this radiation source are adapted to the wavelengths detectable by the detection elements. Furthermore, it is possible to provide an adjustable radiation intensity of the radiation source in order to adapt the radiation intensity to the reflection behavior of the film tube. This helps to avoid the situation in which the radiation reflected from the film tube is of such intensity that the detector reaches a saturation level at which proper detection is not possible. For example, the first type of detector can detect radiation in the infrared range (wavelengths between 700 nm and 1 mm, especially between 3000 nm and 1 mm). Another type of detector can detect radiation in the range of human visible light (wavelengths between 380 nm and 800 nm) and/or in the ultraviolet range (wavelengths between 1 and 380 nm).

At least one radiation source can also be arranged within the film tube. For example, it is thus possible to infer a different film thickness and/or film temperature if the transmission of the radiation differs from one detection element to the next. With this device it is now possible, for example, to detect the contour of the film tube permanently or at intervals. The images can then be compared with each other or with a target image, so that deviations from a target shape or changes over time can be determined. In a simpler case the determined contour may be used to calculate a symmetry line of the film bubble or the film tube. This symmetry line, calculated in this way, can now be compared with the symmetry line of the blown film line. The deviation of both lines of symmetry from each other can thus be determined.

These determinations can serve as the basis for changing the setting parameters of the blown film line or other process and/or production parameters. Furthermore, it may be envisaged that at least one detector 10 detects electromagnetic radiation in the infrared radiation range (wavelength 700 nm to 1 mm). Such a detector can be used for the purpose of positioning a second detector with respect to its viewing range.

In order to be able to assess, for example, a desired rotational symmetry of the film tube, at least one swivel arrangement can be provided in one embodiment of the invention, with which the detector can be pivoted in the circumferential direction of the film tube. Preferably, the swivel axis runs around the symmetry axis of the film tube, whereby the nominal axis of symmetry is referred to in this case.

The film tube can therefore be viewed from different circumferential angles, whereby the contour of the film tube can now be evaluated not only as a function of time but alternatively or additionally also as a function of the circumferential angle. A swivel arrangement can comprise a rail system that is stretched in particular in a plane transverse to the transport direction.

The detector can now be fastened to a sled arranged displaceable on this rail system, so that it can be moved, in particular, in a rotating or reversing manner. A swivel arrangement may also include a lever system mounted to a swivel bearing, wherein the detector is attached to the lever system.

The detector may then be movable in a revolving or reversing manner around the film tube, as it were, in an orbital path.

A swivel arrangement can furthermore be moved in height, i.e. along the transport direction of the film tube. This makes it possible to detect different areas of the film tube along the transport direction without a possible interfering or distorting angular error.

Furthermore, it is conceivable to generate at least one three-dimensional image from the plurality of images obtained as a function of the circumferential angle. Thus, among other things, the depth of focus of the image can be varied. Thus, among other things, the depth of focus of the image can be varied.

Alternatively, or additionally, it is conceivable to provide a second detector. This can be arranged offset in the circumferential direction, for example by a fixed angle, e.g. by 90 degrees In this way, for example, the contour of the film tube, but also other characteristic properties can be detectable from different viewing angles. A combination of the images generated by these detectors also provides information about the symmetry of the film tube. One of the detectors or both detectors can be arranged at or on a swivel arrangement.

Preferably, in accordance with the invention, at least one detector is positioned at the height of the so-called frost line, so that only the smallest possible angular error has to be taken into account at this important point. However, angular errors with respect to the transport direction must be evaluated. In particular, this applies if at least one detector is used to view the contour of the film tube from leaving the annular nozzle.

Another aspect of the invention relates to a method for producing a plastic film tube with a blown film line, wherein
a plastic melt with a closed cross-section is discharged with an annular nozzle
the plastic melt is extracted from the direction of the annular nozzle by means of an extraction device, forming the film tube
an air supply device arranged downstream of the annular nozzle, as seen in the transport direction of the film tube, can be used to supply an air quantity.
with a calibration device arranged behind the annular nozzle, as seen in the transport direction of the film tube, encompassing the outer circumference of the film tube is limited The method, according to the invention, is characterized by the fact that electromagnetic radiation reflected from different points of the film tube is detected by at least one detector with several detection elements radiation, so that at least one surface area and/or one contour area of the film tube is detected with respect to characteristic properties.

This method fulfills the same tasks and achieves the same advantages as have already been described in connection with the blown film system according to the invention.

In one embodiment of the process, according to the invention, it is envisaged that leaving the annular nozzle, the film tube is imprinted with an interference point on the film tube after it leaves the annular nozzle, the position of which in and/or transverse to the transport direction is detected by the detector at different times in order to determine a location and/or velocity profile of the interference point.

The point of interference is designed in such a way that it differs in its reflection from the surrounding area of the film tube. This means that the position of the point of interference can be precisely determined by the detector for each detection. If detection is now carried out at different times while the point of interference is within the detection range of the detector, the individual positions can be determined against the corresponding times, so that a precise determination of the position can be made. This location profile includes coordinates of the point of interference in the transport direction and transverse to the transport direction. A velocity-time profile can be derived from this location-time profile. From such a velocity-time profile, it can be derived, for example, at which location the velocity of the point of interference does not change anymore or only within a limited range. This location can now be brought into connection with the frost line so that a particular method has been created with which the frost line can be detected.

In particular, using a location-variable detection element described above or using two detection elements, it is thus possible to obtain a three-dimensional and time-dependent image of location or velocity vectors.

In a further embodiment of the method, it is provided that the point of interference is a thick or thin spot, a stipple, or a particle inserted into or attached to the film tube. It may also be a scratch, for example. In particular, a thick or thin spot may be created by locally heating (thinning) or cooling (thickening) the film tube. A stipple is a point of interference caused, for example, by defective plastic material or caused by defective processing. In the present case, therefore, it may be intended to subject the film tube to a fault, for example, with strong heating which leads to a local burning of the material. A particle inserted into or attached to the film tube may be a foreign body, for example, a plastic or metal projectile that could be transported onto the film tube.

A point of interference generated in this way can easily be detected by a detector. Preferably, such points of interference have a small extension, in particular, less than 5 mm, because they are strongly localized.

In particular, it is intended to apply points of interference during a roller or job change i.e., to those sections of the film tube that do not meet the requirements of good production anyway and are thus removed. However, it is also possible to apply the points of interference in the course of the production of goods. In this case, these points of interference are detected during further processing of the film tube produced and the corresponding sections are discarded as rejects. Re-detection can be avoided by storing the location of the point of interference when it is encountered and communicating it to further processing. When the film tube or a film web produced from it is wound up, the location of a defect can be communicated to each winding by indicating the corresponding running meter position. Such data for each reel can be recorded in a so-called reel log. Such a reel log can be assigned to an identification feature of a reel, e.g., a QR code, and stored in any form, for example on an Internet server.

In addition, it is possible, utilizing repeated detection of points of interference, to determine data over time of characteristic properties of the film tube and thus to make statements about the film quality over time. Consequently, it is possible to predict the further course over time during the current production order or during a subsequent production order.

It is also possible to record the properties of the film tube detected by the detector for each manufacturing job and to compare different manufacturing jobs with each other. This helps to detect errors in the manufacturing parameters and/or in the raw materials. If, for example, all the manufacturing parameters are the same for a follow-up order that is intended to be the same as the previous, it can be concluded that the raw materials used are different if the contour of the film tube differs. Characteristic properties of the raw material can thus be determined, i.e., a "fingerprint".

In a further embodiment of the method, according to the invention, it is possible to calibrate and determine the absolute temperature of the film tube by means of a detector that, in particular, detects radiation in the infrared range. For this purpose, it is possible to measure the temperature of at least one film guiding element, which is placed in the calibration cage and guides the film tube. After a settling time, this temperature is in balance with the temperature of the film tube. In particular, the temperatures of the film tube and the film guide element are the same. The infrared radiation characteristic for this temperature is now measured by the detector and assigned to the measured temperature so that the detector is subsequently calibrated. Obviously, temperature calibration of at least one detector can also be carried out by means of a film section that has a known temperature or has been brought to a predetermined temperature. This temperature can be determined in absolute terms by means of an independent temperature meter.

An absolute temperature measurement, as achieved by the calibration described above, can be used in order to make a comparison with previous applications where at least one previous application produced the same film as the current application. Such a comparison can alert to production errors, particularly in the case of deviations from the previous job.

Further advantages, features, and details of the invention will become apparent from the following description, in which various examples of embodiments are explained in detail with reference to the figures. The features mentioned in the claims and in the description may be, each individually or in any combination, essential to the invention. Within the scope of the entire disclosure, features and details described in connection with the process according to the invention apply of course also in connection with the blown film line according to the invention and vice versa, so that reference is or can always be made mutually to the individual aspects of the invention in the disclosure. The individual figures show:

FIG. 1 Side view of a blown film line according to the invention

Figure 2:
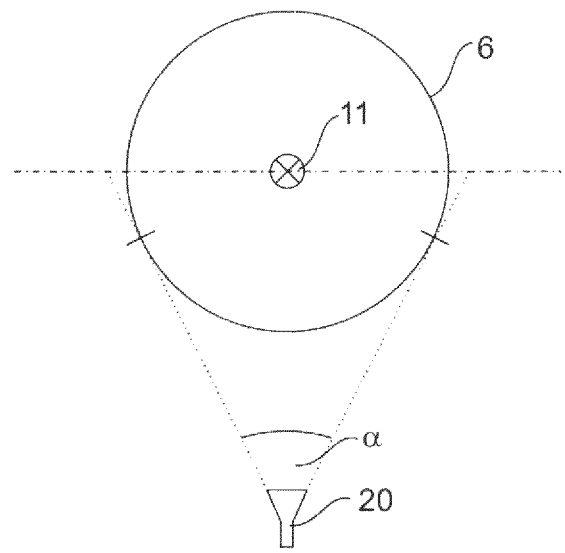

FIG. 2 View II-II from FIG. 1

Figure 3:
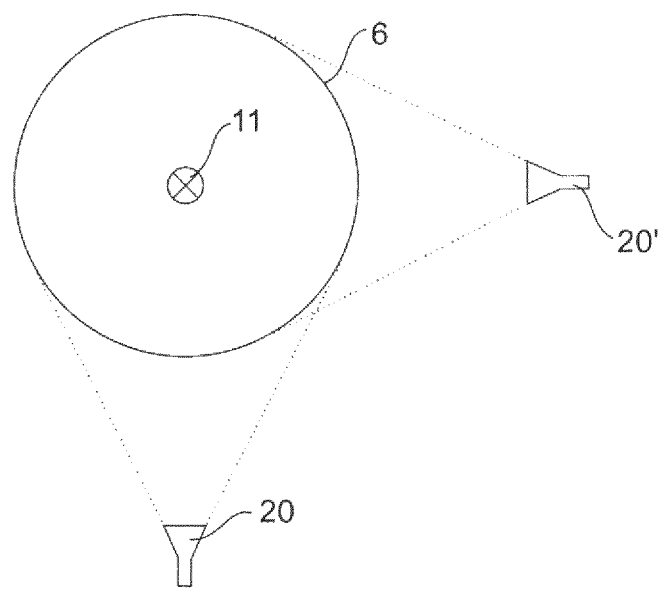

FIG. 3 A further embodiment of the invention with several detectors

Figure 4:
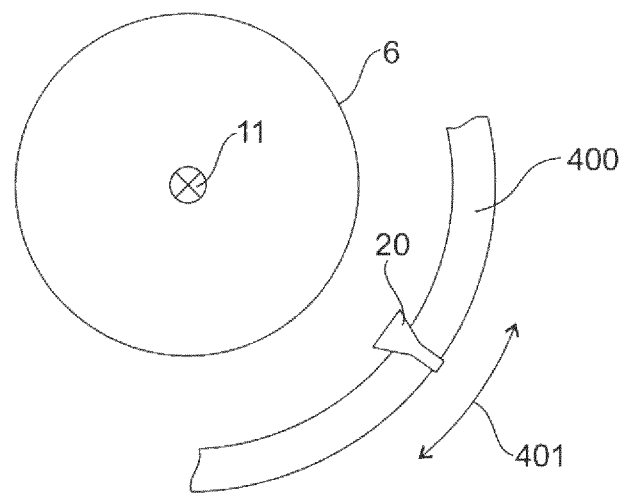

FIG. 4 An embodiment of the invention with a swiveling device Illustration of a

Figure 5A:
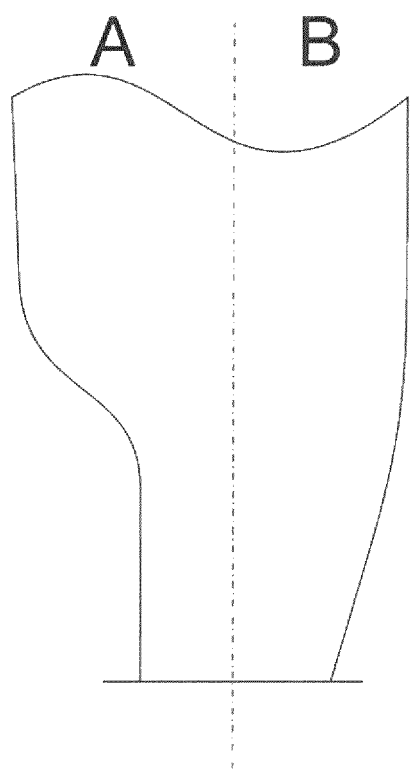
Figure 5B:
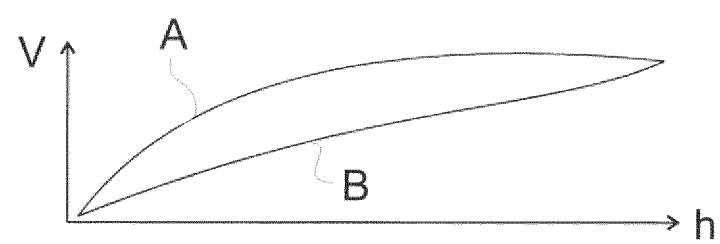

FIG. 5 The process according to the invention

FIG. 1 shows apparatus 1 for the production of a film tube, namely a blown film line 1, which initially comprises at least one extruder 2, with which, for example, plastic present in granular form can be plasticized. The plastic melt thus produced is fed via line 3 to an extrusion tool 4, which can also be referred to as a nozzle head, from which this melt is transferred into a film tube 6, so that this melt stream can be withdrawn from an annular nozzle 5, which is not visible in this figure, in the direction of transport or withdrawal z. A yet unconsolidated film tube 6 var is now in place. This is inflated from the inside by a slight overpressure so that it has a large diameter inside the calibration device 7. For this purpose, an air supply device 13 is provided, which is located inside the annular nozzle 5 and extends partially in the transport direction. This air supply device is supplied with air through the extrusion tool.

The film tube is solidified by cooling, whereby part of the heat of the film tube is released into the environment, in particular by means of a temperature control device 8, which is often referred to as a cooling ring due to its annular design that encloses the film tube.

After passing through the calibration device, film tube 6 enters the active area of a flattening device 9, in which the circular film tube is converted into an elliptical cross-section with increasing eccentricity until it forms a double-layered plastic film which is joined together at its sides, under the influence of the extraction device which comprises two extraction rollers 10.

The flattening device is positioned so that it can rotate, whereby the axis of rotation is substantially aligned with the tube or symmetry axis 11, which is indicated by a dashed line in FIG. 1. The rotatability of the flattening device is indicated by arrow 12. The rotatability of the flattening device is indicated by arrow 12.

FIG. 1 further shows a reversing device 15, which fulfills the task of guiding the flattened film tube from the flattening device to the stationary roller 16 without damage occurring.

The arrow 17 indicates that this film tube, after passing through the reversing device 15, is guided for further processing, which is not specified in more detail here.

Seen in the transport direction z, between the annular nozzle 5 and the calibration basket 7, at least one detector 20 is placed, with which surface elements of film tube 6 can be detected. The detector is arranged outside film tube 6 but directed towards it. The detector can be attached directly or indirectly to any component of the blown film line 1. However, it is also conceivable to set up the detector independently of the blown film line 1 on its own stand, for example, a tripod, within the production facility.

FIG. 2 shows section II-II and thus an arrangement with only one detector directed at the film tube. Due to the small spatial extension of the detector in comparison with the film tube, the detector does not have an overview of the entire width of the film tube and therefore, an angular error occurs. The area observed by the detector is characterized by the viewing angle a, which depends on the distance of the detector to the symmetry axis of the film tube, which essentially corresponds to the transport direction of the film tube, and the width of the film tube. From these two sets of information, the detector can now be calibrated and the actual shape of the film tube, in particular, the contour, can be calculated. The illustration refers to the plane that is essentially orthogonal to the transport direction of the film tube. Nevertheless, the same principle is also relevant for a plane spanned by the transport direction and the position of the detector.

FIG. 3 shows an embodiment example with two cameras 20, and 20', which are positioned offset by an angle in the circumferential direction of the film tube. Both detectors are preferably located on a common plane that is orthogonal to the transport direction z of the film tube 6. In this way it is possible, for example, to analyze the contour of the film tube from two different perspectives and, in particular, to identify the non-roundness of the film tube. For example, an undesired oval cross-section of film tube 6 can be avoided.

The design shown in FIG. 4 pursues in particular the same objective as the design example in FIG. 3, namely the detection of out-of-roundness of the film tube. In contrast to FIG. 3, preferably only one detector is present, which, however, is arranged on or at a swivel arrangement. This allows detector 20 to be pivoted in the direction of the double arrow 401 about the symmetry axis of the film tube. In the present example, this swivel arrangement is designed as a rail system 400. On these rails, a sliding sled (not shown) is assembled on which the detector is mounted.

FIG. 5 illustrates, in figure part 5*a*, a film tube divided into a right and a left half, separated by the dash-dotted center line. The left half is labeled A and the right half is labeled B. Both halves are of different shapes with the same initial and final diameters. In half A, the film tube is initially extended in the transport direction, and only in the further course is it extended in the transverse direction. In the case of B, the film tube is stretched in the transverse direction immediately after leaving the annular nozzle in the transverse direction, but also in the transport direction.

These differences can be determined by means of a detector if a point of interference is introduced into the film tube and the position of this point of interference is recorded as a function of time.

Figure part 5*b* shows the speed profiles of points of interference in the transport direction of the film tube in the respective half of the film tube shown. The axis h indicates the height, i.e., the position in the transport direction, whereas the axis V indicates the speed. The examples of velocity profiles shown can be determined with the detector in the described manner. Graph A of half A in FIG. 5*a* initially shows a sharper increase in speed than graph B. Graph A flattens out in the further course of the transport direction. Graph B, for example, has a linear increase in velocity. Generally, similar graphs can also be obtained for the transverse direction of the points of interference.

Overall, such a measurement method will allow conclusions to be drawn about the orientation of the molecules contained in the film. In the case of an initial stretching in the transport direction (half A), initially, molecules oriented parallel to the transport direction can be obtained. In further progress, there is hardly any orientation in the transport direction, but rather transverse to it. Thus, the molecular orientation can be in the transverse as well as in the longitudinal direction. In the case of B, the molecules are initially oriented in the transverse direction but in further progress increasingly in the longitudinal direction, so that overall, the orientation prevails in the longitudinal direction. The predominant orientation of the molecules will influence the characteristic properties of the film.

| Reference list | |
|---|---|
| 1 | Apparatus for the production of a film tube |
| 2 | Extruder |
| 3 | Line |
| 4 | Extrusion tool |
| 5 | Annular nozzle |
| 6 | Film tube |
| 7 | Calibration device |
| 8 | Temperature device |
| 9 | Flattening device |
| 10 | Extraction rollers |
| 11 | Tube or symmetry axis |
| 12 | Rotatability of the flattening device |
| 13 | |
| 14 | |
| 15 | Reversing device |
| 16 | Roller |
| 17 | Arrow |
| 18 | |
| 19 | |
| 20, 20' | Detector/Camera |
| 400 | Rail system |
| 401 | Double arrow |
| A | Left half |
| B | Right half |
| h | Height |
| V | Velocity |
| z | Transport or direction, respectively |

The invention claimed is:

1. A blown film line for the production of a film tube made of plastic, the blown film line comprising:
an annular nozzle from which a plastic melt with a closed cross-section is discharged;

an extraction device with which the plastic melt is extracted from the direction of the annular nozzle, forming the film tube;

an air supply device downstream of the annular nozzle, as seen in the transport direction of the film tube, with which an air quantity is supplied; and a calibrating device that, viewed in the transport direction of the film tube, engages around the film tube and by means of which the outer circumference of the film tube is limited; and wherein the blown film line further comprises at least one detector with several detection elements, with which electromagnetic radiation emitted or reflected from different points of the film tube is detected, so that at least one surface region and/or one contour region of the film tube is detected with regard to one or more characteristic properties, wherein the detector comprises at least 32 detection elements.

2. The blown film line according to claim 1, wherein at least one swivel arrangement is provided such that the detector is swiveled in the circumferential direction of the film tube.

3. The blown film line according to claim 1, wherein at least one second detector is to be provided, which is arranged offset from the first detector in the circumferential direction of the annular nozzle.

4. The method according to claim 1, wherein the one or more characteristic properties are: temperature, temperature distribution, surface shape, contour, three-dimensional shape, molecular orientation, thickness, thick spots, thin spots, dots, scratches, foreign bodies, or any combination thereof.

\* \* \* \* \*